(12) United States Patent
Hamano et al.

(10) Patent No.: US 11,644,096 B2
(45) Date of Patent: May 9, 2023

(54) DIAGNOSIS DEVICE AND DIAGNOSIS METHOD FOR TEMPERATURE SENSOR OF AUTOMATIC TRANSMISSION

(71) Applicants: JATCO Ltd, Fuji (JP); NISSAN MOTOR CO., LTD., Yokohama (JP)

(72) Inventors: Masahiro Hamano, Atsugi (JP); Yasunori Murase, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 58 days.

(21) Appl. No.: 17/439,058

(22) PCT Filed: Jan. 22, 2020

(86) PCT No.: PCT/JP2020/002047
§ 371 (c)(1),
(2) Date: Sep. 14, 2021

(87) PCT Pub. No.: WO2020/188995
PCT Pub. Date: Sep. 24, 2020

(65) Prior Publication Data
US 2022/0154819 A1 May 19, 2022

(30) Foreign Application Priority Data
Mar. 15, 2019 (JP) .............................. JP2019-048758

(51) Int. Cl.
*F16H 61/12* (2010.01)
*F16H 61/00* (2006.01)
*F16H 61/16* (2006.01)

(52) U.S. Cl.
CPC ......... *F16H 61/12* (2013.01); *F16H 61/0006* (2013.01); *F16H 61/16* (2013.01);
(Continued)

(58) Field of Classification Search
CPC ...... F16H 61/0006; F16H 61/12; F16H 61/16; F16H 2061/1212; F16H 2061/122;
(Continued)

(56) References Cited

U.S. PATENT DOCUMENTS

2007/0247117 A1* 10/2007 Morita .................. H02J 7/0016
320/132
2013/0275016 A1* 10/2013 Mitani ..................... F16H 59/72
701/62
2016/0279770 A1* 9/2016 Yokoyama ................ B25F 5/02

FOREIGN PATENT DOCUMENTS

JP 2014-077461 A 5/2014

* cited by examiner

*Primary Examiner* — Edwin A Young
(74) *Attorney, Agent, or Firm* — Foley & Lardner LLP

(57) ABSTRACT

A diagnosis device determines diagnoses one of primary and secondary board temperature sensors as abnormal, in response to a condition that a state in which a primary temperature sensor value and a secondary temperature sensor value deviate from each other by a predetermined value or more continues for a predetermined duration or more; performs torque limitation to limit a torque inputted from an engine to an automatic transmission, during driving in a predetermined travel section based on a predetermined condition, after the one of the primary and secondary board temperature sensors is diagnosed as abnormal; and performs transmission shift restriction to restrict shifting of the automatic transmission along with the torque limitation, in response to a condition that the one of the primary and secondary board temperature sensors continues to be diagnosed as still abnormal after the driving in the predetermined travel section is completed.

7 Claims, 9 Drawing Sheets

(52) U.S. Cl.
CPC .. *F16H 2061/122* (2013.01); *F16H 2061/124* (2013.01); *F16H 2061/1212* (2013.01); *F16H 2061/1284* (2013.01); *F16H 2061/1292* (2013.01)

(58) Field of Classification Search
CPC ....... F16H 2061/124; F16H 2061/1284; F16H 2061/1292; F16H 2061/1232; F16H 2061/1244
See application file for complete search history.

ENGAGEMENT TABLE

| NUMBER OF SHIFT POSITION | B1 | B2 | B3 | K1 | K2 | K3 |
|---|---|---|---|---|---|---|
| 1 |  | ● | ● |  |  | ● |
| 2 |  | ● |  |  | ● | ● |
| 3 |  | ● | ● |  | ● |  |
| 4 |  | ● | ● | ● |  |  |
| 5 |  |  | ● | ● | ● |  |
| 6 |  |  |  | ● | ● | ● |
| 7 |  |  | ● | ● |  | ● |
| 8 | ● |  |  | ● |  | ● |
| 9 | ● |  | ● | ● |  |  |
| Rev | ● | ● | ● |  |  |  |
| N-RANGE, P-RANGE |  |  |  |  |  |  |

DIAGNOSIS DEVICE AND DIAGNOSIS METHOD FOR TEMPERATURE SENSOR OF AUTOMATIC TRANSMISSION

TECHNICAL FIELD

The present invention relates to a diagnosis device and a diagnosis method for a temperature sensor of an automatic transmission mounted on a vehicle.

BACKGROUND ART

Conventionally known is a control device for a vehicle on which an automatic transmission is mounted, wherein the control device includes: a transmission cooling system diagnosis means for diagnosing whether a transmission cooling system is abnormal, by comparison between a transmission oil temperature and a determination threshold; and a transmission shift control means for changing a shift pattern of the automatic transmission to a high vehicle speed side or fixing the automatic transmission to a predetermined transmission shift position, when the transmission cooling system is diagnosed by the transmission cooling system diagnosis means as being in a state of abnormally high temperature (see Patent Document 1).

When a temperature sensor fails, the conventional device cannot determine whether or not the temperature is high. Accordingly, it is conceivable to fix the automatic transmission to a predetermined transmission shift position when the temperature sensor fails. If a board temperature sensor is implemented by a redundant system including a primary one and a secondary one, when a failed one of the sensors can be identified as having an electrical failure (break, short) or so, a control may be continued with reference shifted to a sensor value from the other of the sensors, thereby suppressing the performance from declining due to the failure. However, when a functional abnormality is diagnosed by comparison between two sensor values, it may be impossible to detect a double failure because the second sensor value with which the first sensor value is compared is already abnormal at the time of the abnormality diagnosis. However, if a countermeasure against abnormality by transmission shift restriction is taken immediately after one of the temperature sensors is diagnosed as having a functional abnormality, it adversely affects driving performance. On the other hand, if the countermeasure against abnormality by transmission shift restriction is suspended even when one of the temperature sensors is diagnosed as having a functional abnormality, there is a problem that because the functional abnormality of the second temperature sensor cannot be detected when a double failure occurs during the suspension, it is impossible to shift to a limp home mode by fixing to a predetermined transmission shift position or so, thereby adversely affecting the condition of the automatic transmission, and making a driver uncomfortable.

It is an object of the present invention to: when an abnormality of single failure is detected by a diagnosis based on comparison between two temperature sensor values, ensure driving performance in a predetermined travel section after the detection of the abnormality; and after the predetermined travel section ends, prepare for a decrease in driving performance which may be caused by a double failure.

Prior Art Document(s)

Patent Document(s)

Patent Document 1: JP 2014-77461 A

SUMMARY OF INVENTION

According to the present invention, the automatic transmission temperature sensor diagnosis device includes an automatic transmission, a transmission control unit, a board temperature sensor, and a board temperature sensor diagnosis controller, wherein the board temperature sensor is a redundant system including a primary board temperature sensor and a secondary board temperature sensor that are set independent from each other. The board temperature sensor diagnosis controller is configured to: determine whether or not a primary temperature sensor value from the primary board temperature sensor and a secondary temperature sensor value from the secondary board temperature sensor deviate from each other by a predetermined value or more; diagnose one of the primary and secondary board temperature sensors as abnormal, in response to a condition that a state in which the primary temperature sensor value and the secondary temperature sensor value deviate from each other by the predetermined value or more continues for a predetermined duration or more; perform torque limitation to limit a torque inputted from a vehicle driving source to the automatic transmission, during driving in a predetermined travel section based on a predetermined condition, after the one of the primary and secondary board temperature sensors is diagnosed as abnormal; and perform transmission shift restriction to restrict shifting of the automatic transmission along with the torque limitation, in response to a condition that the one of the primary and secondary board temperature sensors continues to be diagnosed as still abnormal after the driving in the predetermined travel section is completed.

Since the primary board temperature sensor and the secondary board temperature sensor are set independent from each other as described above, it is assumed that a single failure and a double failure do not occur simultaneously in the board temperature sensors. Based on this assumption, a stepwise treatment is adopted in which the torque limitation is performed in the predetermined travel section where no double failure is possible, and the transmission shift restriction is performed in the travel section in which a double failure is possible. Accordingly, it is possible to: when an abnormality of single failure is detected by a diagnosis based on comparison between two temperature sensor values, ensure driving performance in a predetermined travel section after the detection of the abnormality; and after the predetermined travel section ends, prepare for a decrease in driving performance which may be caused by a double failure.

MODE(S) FOR CARRYING OUT INVENTION

Figure 1:
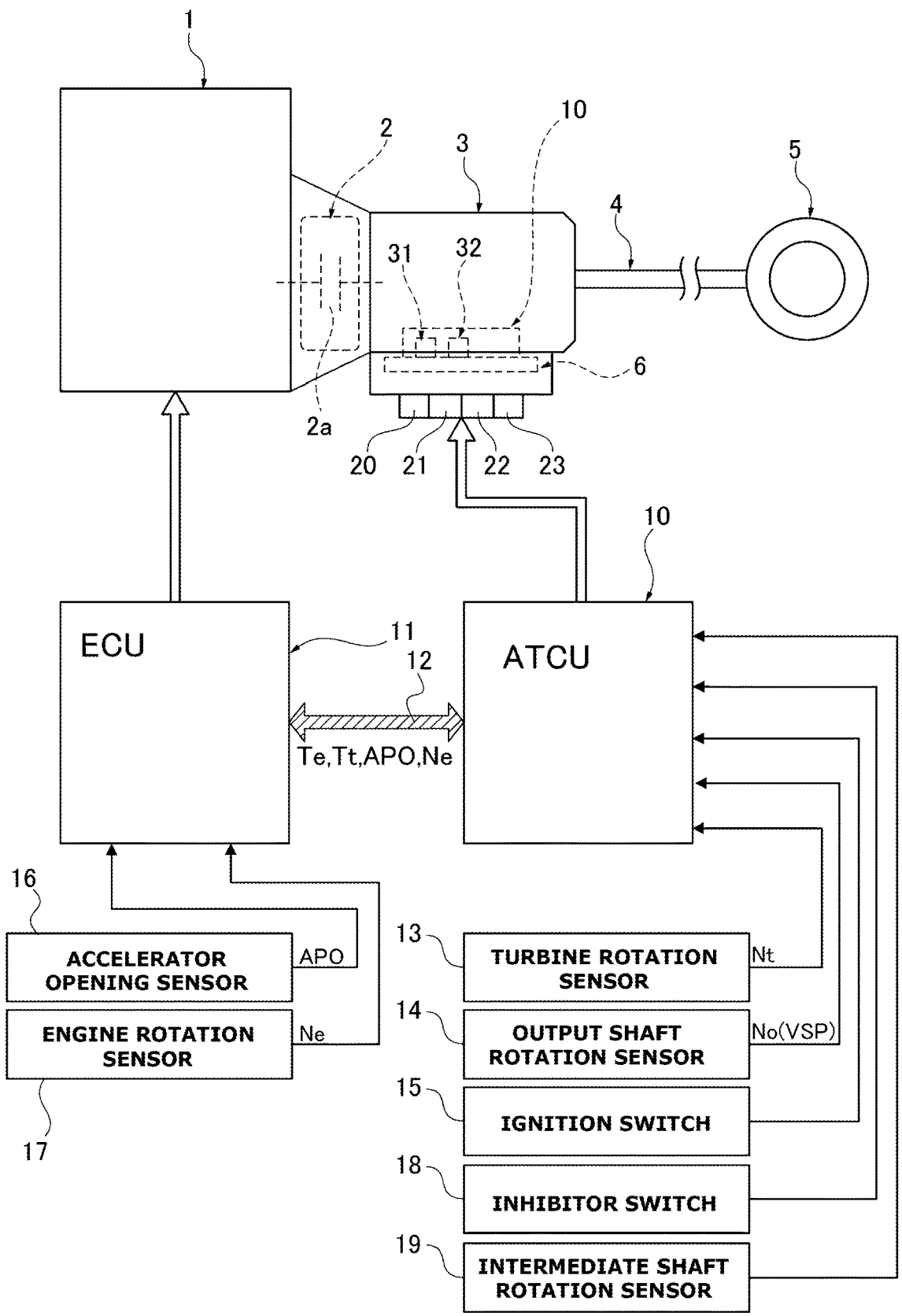
FIG. 1 is an overall system diagram showing an engine vehicle on which an automatic transmission is mounted, wherein a temperature sensor diagnosis device according to an embodiment is applied to the automatic transmission.

The following describes a mode for carrying out an automatic transmission temperature sensor diagnosis device according to the present invention with reference to embodiments shown in the drawings.

The temperature sensor diagnosis device according to the embodiment is applied to an engine vehicle (an example of a vehicle) on which an automatic transmission having nine forward speeds and one reverse speed is mounted. The following describes configurations of the embodiment in separate sections, i.e. "Overall System Configuration", "Specific Configuration of Automatic Transmission", "Specific Configuration of Hydraulic Control System and Electronic Control System", and "Configuration of Board Temperature Sensor Diagnosis Process".

<Overall System Configuration> FIG. 1 is an overall system diagram showing an engine vehicle on which an automatic transmission is mounted, wherein a temperature sensor diagnosis device according to an embodiment is applied to the automatic transmission. The following describes overall system configuration with reference to FIG. 1.

As shown in FIG. 1, the engine vehicle includes a drive system which includes an engine 1 (vehicle driving source), a torque converter 2, an automatic transmission 3, a propeller shaft 4, and driving wheels 5. The automatic transmission 3 is provided with a control valve unit 6 which includes a spool valve, a hydraulic control circuit, solenoid valves, etc., for shifting of the automatic transmission 3. The control valve unit 6 includes actuators (a clutch solenoid 20, a line pressure solenoid 21, a lubrication solenoid 22, and a lockup solenoid 23), each of which operates in response to a control command from an AT control unit 10. The clutch solenoid 20 is provided to each of friction elements. The torque converter 2 includes a built-in lockup clutch 2a structured to solidly couples a crankshaft of the engine 1 with an input shaft IN of the automatic transmission 3.

As shown in FIG. 1, the engine vehicle includes an electronic control system which includes the AT control unit 10 (abbreviated as "ATCU"), an engine control unit 11 (abbreviated as "ECU"), and a CAN communication line 12.

The AT control unit 10 is mechatronically integrated with the control valve unit 6 and placed on an upper face of the control valve unit 6. The AT control unit 10, which is a mechatronically integrated unit, includes a unit board on which temperature sensors are mounted, wherein the temperature sensors include a primary board temperature sensor 31 and a secondary board temperature sensor 32 for sensing temperature of the unit board. Of these sensors, the primary board temperature sensor 31 is employed to present a primary temperature sensor value MA1 for normal control. Specifically, the primary board temperature sensor 31 and the secondary board temperature sensor 32 respectively send the primary temperature sensor value MA1 and a secondary temperature sensor value SUB1 to the AT control unit 10, and are not in direct contact with transmission working fluid (ATF) in an oil pan as in a well-known automatic transmission unit.

The AT control unit 10 serves as a temperature sensor diagnosis device of the automatic transmission 3, and receives input of signals from a turbine rotation sensor 13, an output shaft rotation sensor 14, an ignition switch 15, an inhibitor switch 18, an intermediate shaft rotation sensor 19, and others.

The turbine rotation sensor 13 senses a turbine rotation speed of the torque converter 2 (=transmission input shaft rotation speed), and sends a signal of turbine rotation speed Nt to the AT control unit 10. The output shaft rotation sensor 14 senses an output shaft rotation speed of the automatic transmission 3, and sends a signal of output shaft rotation speed No (=vehicle speed VSP) to the AT control unit 10. The ignition switch 15 sends an ignition switch signal (on/off) to the AT control unit 10. The inhibitor switch 18 senses a range position selected by driver's selecting operation to a select lever, a select button and the like, and sends a range position signal to the AT control unit 10. The intermediate shaft rotation sensor 19 senses a rotation speed of an intermediate shaft (which is a rotation member connected to a first carrier C1), and sends a signal of intermediate shaft rotation speed Nint to the AT control unit 10.

The AT control unit 10 monitors changes of an operating point (VSP, APO) in a transmission shift map (see FIG. 4), which is defined by a vehicle speed VSP and an accelerator opening APO, and performs a transmission shift control based on the following basic shift patterns:

1. Automatic upshift (in response to an increase in the vehicle speed with the accelerator opening maintained),
2. Foot release upshift (in response to accelerator foot release operation),
3. Foot return upshift (in response to accelerator return operation),
4. Power-on downshift (in response to a decrease in the vehicle speed with the accelerator opening maintained),
5. Small-opening rapid depression downshift (in response to a small amount of accelerator operation),
6. Large-opening rapid depression downshift (in response to a large amount of accelerator operation: "kickdown"),
7. Slow depression downshift (in response to slow accelerator depression and increase in the vehicle speed), and
8. Coast downshift (in response to a decrease in the vehicle speed due to accelerator release operation).

The engine control unit 11 receives input of signals from an accelerator opening sensor 16, an engine rotation sensor 17, and others.

The accelerator opening sensor 16 senses an accelerator opening determined by driver's accelerator operation, and sends a signal of accelerator opening APO to the engine control unit 11. The engine rotation sensor 17 senses a rotation speed of the engine 1 and sends a signal of engine rotation speed Ne to the engine control unit 11.

The engine control unit 11 performs various controls of the engine alone, and further performs an engine torque limitation control and others in coordination with controls performed by the AT control unit 10. The AT control unit 10 and the engine control unit 11 are connected to each other via the CAN communication line 12 that is structured to allow bidirectional information exchange therebetween. Thereby, when receiving input of an information request from the AT control unit 10, the engine control unit 11 transmits information on the accelerator opening APO, engine speed Ne, engine torque Te, and turbine torque Tt to the AT control unit 10 in response to the information request. Furthermore, when receiving input of a request for engine torque limitation based on an upper limit torque from the AT control unit 10, the engine control unit 11 performs an engine torque limitation control to limit the engine torque by a predetermined upper limit torque.

<Specific Configuration of Automatic Transmission>

Figures 2, 3:
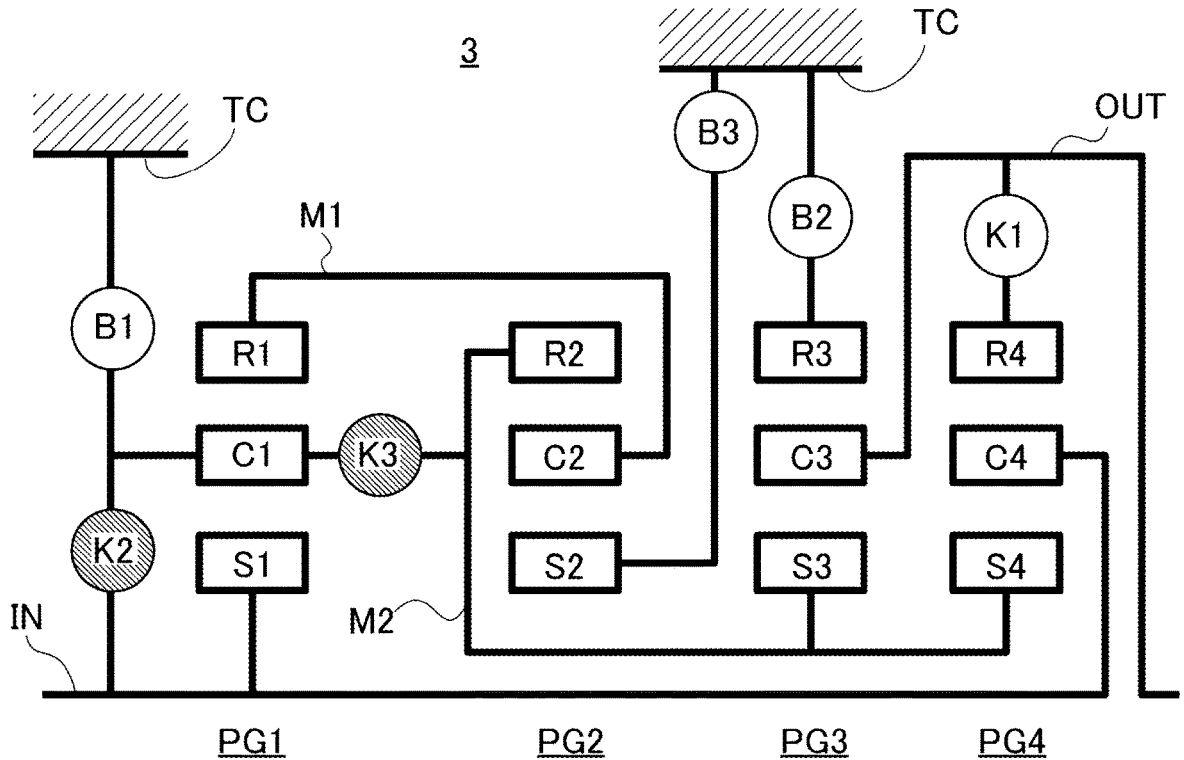
FIG. 2 is a skeleton diagram showing an example of the automatic transmission to which the temperature sensor diagnosis device according to the embodiment is applied.
FIG. 3 is an engagement table showing how friction elements for shifting of the automatic transmission, to which the temperature sensor diagnosis device according to the embodiment is applied, are engaged for each transmission shift position.
Figure 4:
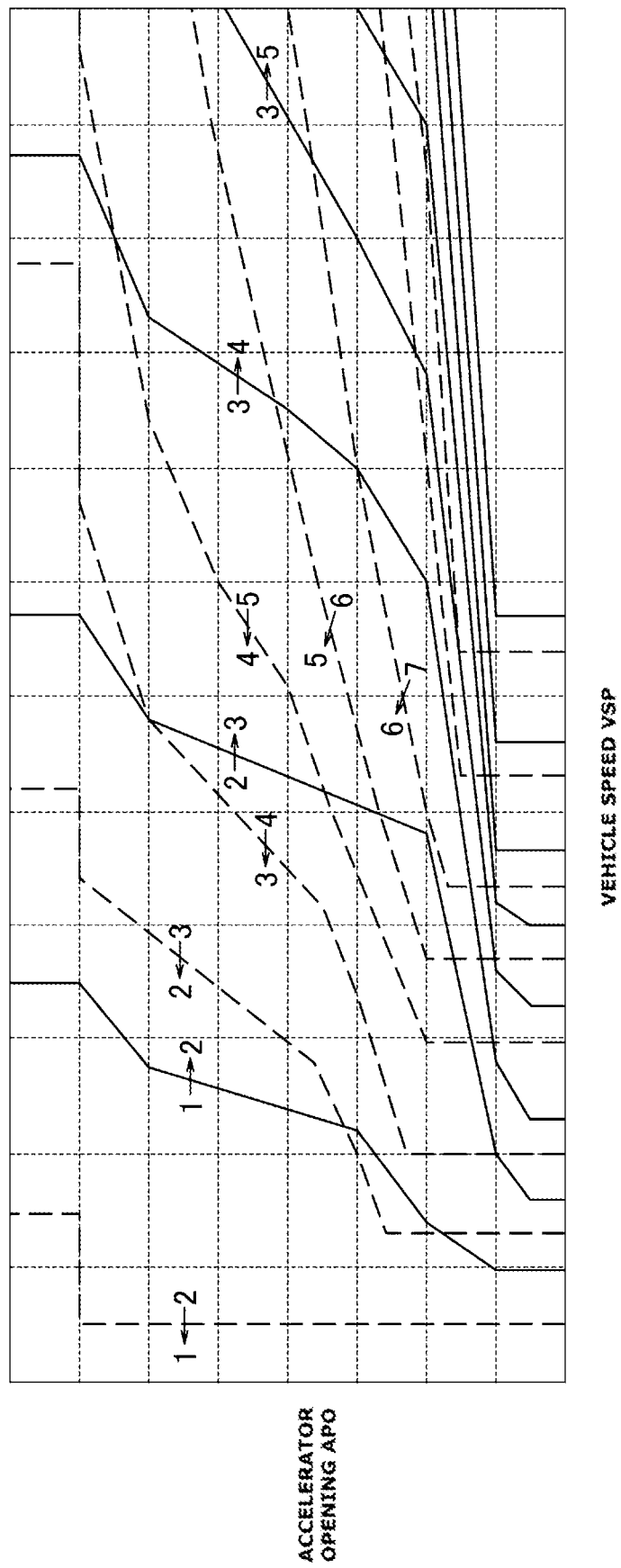
FIG. 4 is a transmission shift map diagram showing an example of a transmission shift map for the automatic transmission to which the temperature sensor diagnosis device according to the embodiment is applied.

FIG. 2 is a skeleton diagram showing an example of the automatic transmission 3 to which the temperature sensor diagnosis device according to the embodiment is applied. FIG. 3 is an engagement table of the automatic transmission 3. FIG. 4 is an example of a transmission shift map for the automatic transmission 3. The following describes specific configuration of the automatic transmission 3 with reference to FIGS. 2 to 4.

The automatic transmission 3 has the following features:
(a) having no one-way clutch as a transmission shift element which mechanically engages and idles;
(b) having friction elements, which include a first brake B1, a second brake B2, a third brake B3, a first clutch K1, a second clutch K2, and a third clutch K3, and are each controlled to be engaged or disengaged independently of each other by the clutch solenoid 20 during transmission shifting; and
(c) wherein the second clutch K2 and the third clutch K3 each have a centrifugal canceling chamber that cancels a centrifugal pressure due to a centrifugal force acting on a clutch piston oil chamber.

As shown in FIG. 2, the automatic transmission 3 includes planetary gears constituting a gear train, wherein the planetary gears include a first planetary gear PG1, a second planetary gear PG2, a third planetary gear PG3, and a fourth planetary gear PG4, which are arranged in this order from the input shaft IN to an output shaft OUT.

The first planetary gear PG1 is a single pinion type planetary gear, and includes: a first sun gear S1; a first carrier C1 that carries pinions meshing with the first sun gear S1; and a first ring gear R1 that meshes with the pinions.

The second planetary gear PG2 is a single pinion type planetary gear, and includes: a second sun gear S2; a second carrier C2 that carries pinions meshing with the second sun gear S2; and a second ring gear R2 that meshes with the pinions.

The third planetary gear PG3 is a single pinion type planetary gear, and includes: a third sun gear S3; a third carrier C3 that carries pinions meshing with the third sun gear S3; and a third ring gear R3 that meshes with the pinions.

The fourth planetary gear PG4 is a single pinion type planetary gear, and includes: a fourth sun gear S4; a fourth carrier C4 that carries pinions meshing with the fourth sun gear S4; and a fourth ring gear R4 that meshes with the pinions.

As shown in FIG. 2, the automatic transmission 3 includes the input shaft IN, the output shaft OUT, a first coupling member M1, a second coupling member M2, and a transmission case TC. The friction elements of the automatic transmission 3, which are engaged and disengaged for transmission shifting, include the first brake B1, the second brake B2, the third brake B3, the first clutch K1, the second clutch K2, and the third clutch K3.

The input shaft IN is a shaft to which a driving torque is inputted from the engine 1 via the torque converter 2. The input shaft IN is constantly connected to the first sun gear S1 and the fourth carrier C4. The input shaft IN is connected to the first carrier C1 via the second clutch K2 so as to be connected to and disconnected from the first carrier C1.

The output shaft OUT is a shaft that outputs a speed-shifted driving torque to the driving wheels 5 via the propeller shaft 4 and a final gear not shown. The output shaft OUT is constantly connected to the third carrier C3. The output shaft OUT is connected to the fourth ring gear R4 via the first clutch K1 so as to be connected to and disconnected from the fourth ring gear R4.

The first coupling member M1 constantly couples the first ring gear R1 of the first planetary gear PG1 with the second carrier C2 of the second planetary gear PG2, with no friction element interposed therebetween. The second coupling member M2 constantly couples the second ring gear R2 of the second planetary gear PG2, the third sun gear S3 of the third planetary gear PG3, and the fourth sun gear S4 of the fourth planetary gear PG4 with each other, with no friction element interposed therebetween.

The first brake B1 is a friction element structured to lock rotation of the first carrier C1 with respect to the transmission case TC. The second brake B2 is a friction element structured to lock rotation of the third ring gear R3 with respect to the transmission case TC. The third brake B3 is a friction element structured to lock rotation of the second sun gear S2 with respect to the transmission case TC.

The first clutch K1 is a friction element that selectively connects the fourth ring gear R4 and the output shaft OUT to each other. The second clutch K2 is a friction element that selectively connects the input shaft IN and the first carrier C1 to each other. The third clutch K3 is a friction element that selectively connects the first carrier C1 and the second coupling member M2 to each other.

FIG. 3 is an engagement table showing how three of the six friction elements of the automatic transmission 3 are engaged simultaneously to establish nine forward speed positions and one reverse speed position when in a D-range. The following describes a transmission shift configuration for establishing each transmission shift position with reference to FIG. 3.

The first speed position is established by simultaneously engaging the second brake B2, the third brake B3, and the third clutch K3. The second speed position is established by simultaneously engaging the second brake B2, the second clutch K2, and the third clutch K3. The third speed position is established by simultaneously engaging the second brake B2, the third brake B3, and the second clutch K2. The fourth speed position is established by simultaneously engaging the second brake B2, the third brake B3, and the first clutch K1. The fifth speed position is established by simultaneously engaging the third brake B3, the first clutch K1 and the second clutch K2. The first to fifth speed positions are underdrive transmission shift positions each having a transmission ratio greater than 1.

The sixth speed position is established by simultaneously engaging the first clutch K1, the second clutch K2, and the third clutch K3. This sixth speed position is a direct drive transmission shift position having a transmission ratio of 1.

The seventh speed position is established by simultaneously engaging the third brake B3, the first clutch K1 and the third clutch K3. The eighth speed position is established by simultaneously engaging the first brake B1, the first clutch K1, and the third clutch K3. The ninth speed position is established by simultaneously engaging the first brake B1, the third brake B3, and the first clutch K1. The seventh to ninth speed positions are overdrive transmission shift positions each having a speed-increasing transmission ratio less than 1.

As shown in FIG. 3, among the first to ninth speed positions, each upshift or downshift to an adjacent transmission shift position is implemented by changeover shifting. Specifically, each shifting to an adjacent transmission shift position is implemented by engaging one friction element other than the three engaged friction elements and disengaging one of the three engaged friction elements while maintaining the remaining two of the three engaged friction elements engaged.

When an R-range is selected, the reverse speed position is established by simultaneously engaging the first brake B1, the second brake B2, and the third brake B3. When an N-range is selected and when a P-range is selected, all the six friction elements B1, B2, B3, K1, K2, and K3 are disengaged.

FIG. 4 shows a transmission shift map that is set and stored in the AT control unit 10. Based on the transmission shift map, shifting among the first to ninth forward speed positions is performed when the D-range is selected. Specifically, when the present operating point (VSP, APO) crosses an upshift line shown by a solid line in FIG. 4, an upshift request is issued. On the other hand, when the present operating point (VSP, APO) crosses a downshift line shown by a broken line in FIG. 4, a downshift request is issued.

Figure 5:
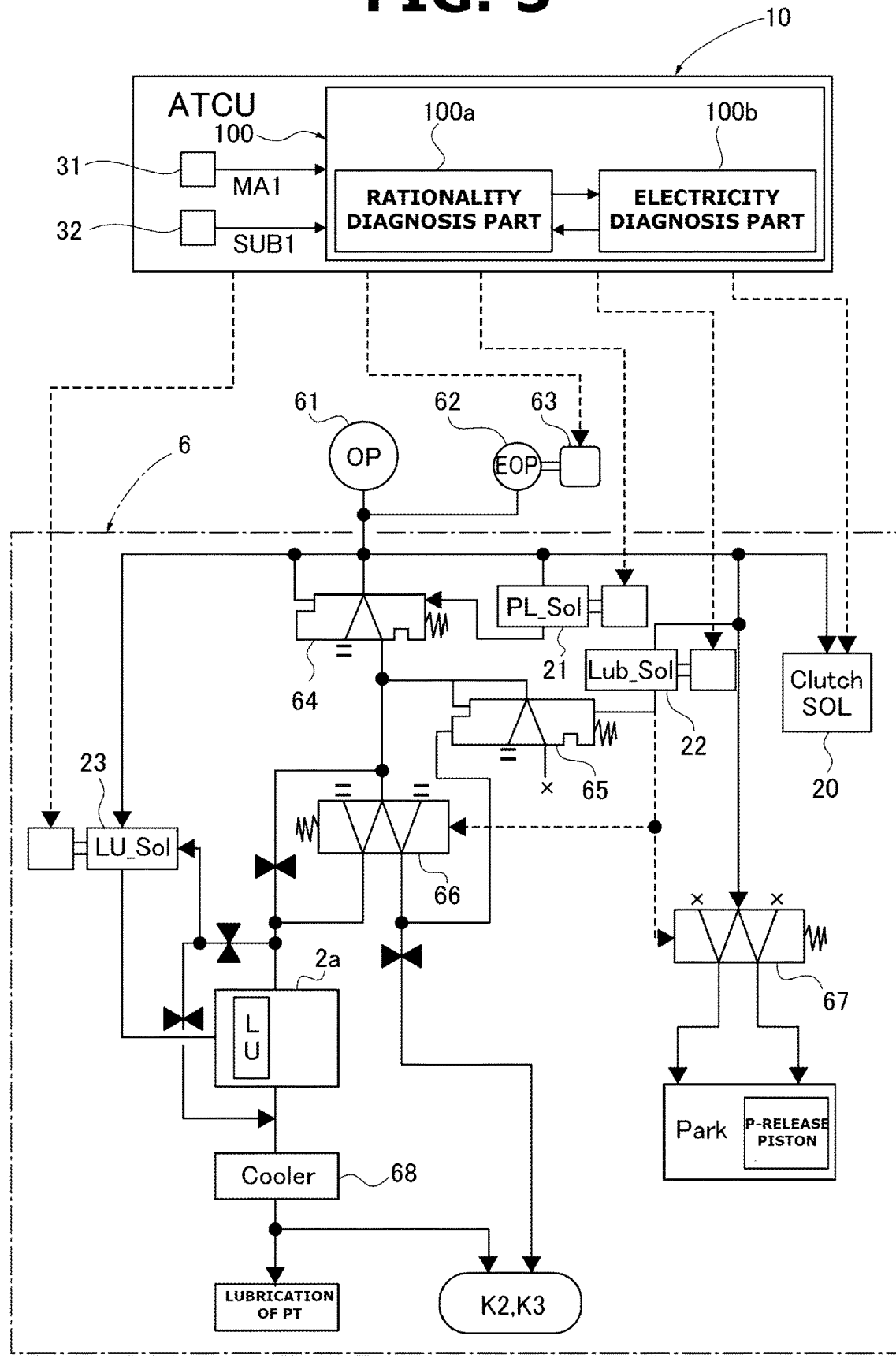
FIG. 5 is a diagram showing specific configuration of a control valve unit and an AT control unit according to the embodiment.

<Specific Configuration of Hydraulic System and Electronic Control System> FIG. 5 shows specific configuration of the control valve unit 6 and the AT control unit 10 according to the embodiment. The following describes specific configuration of the hydraulic system and the electronic control system with reference to FIG. 5.

The control valve unit 6 includes a mechanical oil pump 61 and an electric oil pump 62 as hydraulic sources. The mechanical oil pump 61 is driven by the engine 1, and the electric oil pump 62 is driven by the electric motor 63.

The control valve unit 6 includes a hydraulic control circuit provided with valves that include the line pressure solenoid 21, a line pressure regulation valve 64, the clutch solenoid 20, and the lockup solenoid 23. The valves further include the lubrication solenoid 22, a lubrication pressure regulation valve 65, a boost switching valve 66, a P-nP switching valve 67, and a cooler 68.

The line pressure regulation valve 64 regulates oil, which is discharged from at least one of the mechanical oil pump 61 and the electric oil pump 62, to a line pressure PL, based on a valve operating signal pressure from the line pressure solenoid 21.

The clutch solenoid 20 produces hydraulic pressures from the line pressure PL as an original pressure, and controls an engagement pressure and a disengagement pressure and others of each friction element (B1, B2, B3, K1, K2, K3). FIG. 5 shows only one clutch solenoid 20, but the friction elements (B1, B2, B3, K1, K2, K3) are provided with corresponding six clutch solenoids.

The lockup solenoid 23 controls a differential pressure of the lockup clutch 2a by excess oil at the time of regulation of the line pressure PL by the line pressure regulation valve 64.

The lubrication solenoid 22 produces a valve operating signal pressure to the lubrication pressure regulation valve 65, a switching pressure to the boost switching valve 66, and a switching pressure to the P-nP switching valve 67, and has a function of regulating the flow rate of lubricating oil, which is supplied to each friction element, to be suitable for suppressing heat generation. The lubrication solenoid 22 mechanically ensures a minimum lubrication flow rate required to suppress heat generation of the friction element except during continuous transmission shift protection, and adjusts a component of lubrication flow rate added to the minimum lubrication flow rate.

The lubrication pressure regulation valve 65 is structured to control the flow rate of lubricating oil, which is supplied via the cooler 68 to a powertrain (PT) including the friction elements and the gear train, in response to the valve operating signal pressure from the lubrication solenoid 22. The flow rate of lubricating oil supplied to the PT is set appropriately by the lubrication pressure regulation valve 65, thereby serving for friction reduction.

The boost switching valve 66 increases the amount of oil supplied to the centrifugal cancelling chambers of the second clutch K2 and the third clutch K3, in response to the switching pressure from the lubrication solenoid 22. This boost switching valve 66 is employed when the amount of oil supplied is to be temporarily increased in a situation where the amount of oil in the centrifugal cancelling chambers is insufficient.

The P-nP switching valve 67 switches an oil passage of the line pressure supplied to a parking module in response to the switching pressure from the lubrication solenoid 22, and performs park locking.

In this way, the control valve unit 6 includes the lubrication solenoid 22, the lubrication pressure regulation valve 65, the boost switching valve 66, and the P-nP switching valve 67, and includes no manual valve for switching among a D-range pressure oil passage, an R-range pressure oil passage, etc.

As shown in FIG. 5, the unit board of the AT control unit 10 is provided with a board temperature sensor system for sensing the temperature of the unit board, wherein the board temperature sensor system is a redundant system including the primary board temperature sensor 31 employed for the control and the secondary board temperature sensor 32. The primary board temperature sensor 31 and the secondary board temperature sensor 32 are set independent from each other. The secondary board temperature sensor 32 is implemented by an ASIC (as an abbreviation of Application Specific Integrated Circuit), and has a factor for heat generation. Accordingly, as the primary temperature sensor value MA1 and the secondary temperature sensor value SUB1 are compared with each other, the secondary temperature sensor value SUB1 is higher by about 1° C. to 3° C. than the primary temperature sensor value MA1 (see FIG. 8).

The AT control unit 10 includes a board temperature sensor diagnosis controller 100 configured to diagnose the board temperature sensors 31 and 32 as normal or abnormal. The board temperature sensor diagnosis controller 100 includes a rationality diagnosis part 100a and an electricity diagnosis part 100b.

The rationality diagnosis part 100a performs a rationality diagnosis (functional abnormality diagnosis) for the board temperature sensors 31 and 32, based on how much the two temperature sensor values MA1 and SUB1 deviate from each other. Specifically, the rationality diagnosis part 100a determines whether or not the primary temperature sensor value MA1 from the primary board temperature sensor 31 and the secondary temperature sensor value SUB1 from the secondary board temperature sensor 32 deviate from each other by a predetermined value or more. When a state in which the primary temperature sensor value MA1 and the secondary temperature sensor value SUB1 deviate from each other by the predetermined value or more continues for a predetermined duration or longer, one of the board temperature sensors 31 and 32 is diagnosed as abnormal.

In response to determination of the functional abnormality by the rationality diagnosis part 100a, an ATCU board protection control is performed, wherein the ATCU board protection control is a two-step control including a step for a situation where no double failure is possible and a step for a situation where a double failure is possible. Specifically, during driving in a travel section corresponding to a first driving cycle from when one of the two board temperature sensors 31 and 32 is diagnosed as abnormal to when the ignition switch 15 is turned off (as a travel section where no double failure is possible), the rationality diagnosis part 100a performs torque limitation to limit a torque inputted from the engine 1 to the automatic transmission 3. Thereafter, when the detection of abnormality of the board temperature sensors 31 and 32 continues in a second or later driving cycle (as a travel section where a double failure is possible), the rationality diagnosis part 100a performs transmission shift restriction to restrict shifting of the automatic transmission 3 in addition to application of the torque limitation during driving in the second or later driving cycle.

The rationality diagnosis part 100a executes the rationality diagnosis for the primary board temperature sensor 31 and the secondary board temperature sensor 32 only when the electricity diagnosis part 100b detects no break/short abnormality.

The electricity diagnosis part 100b performs a break/short abnormality diagnosis (electricity diagnosis) of the board temperature sensors 31 and 32 by high/low determination about the primary temperature sensor value MA1 and the secondary temperature sensor value SUB1. Specifically, when at least one of the primary board temperature sensor 31 and the secondary board temperature sensor 32 is detected as having a break/short abnormality, the rationality diagnosis about the two board temperature sensors 31 and 32 is inhibited. If the break/short state continues for a predetermined duration or longer, at least one of the primary board temperature sensor 31 and the secondary board temperature sensor 32 is diagnosed as having a break/short abnormality.

In response to determination of the abnormality by the electricity diagnosis part 100b, an ATCU board protection control is performed, wherein the ATCU board protection control different for determination of a single failure and for determination of a double failure. Specifically, when it is diagnosed as having a break/short abnormality and it is not diagnosed as having an abnormality by the rationality diagnosis part 100a during this driving cycle (at the time of determination of a single failure), the torque limitation is performed to limit the input torque from the engine 1 to the automatic transmission 3. On the other hand, when it is diagnosed as having a break/short abnormality and it is already diagnosed as having an abnormality by the rationality diagnosis part 100a during this driving cycle (at the time of determination of a double failure), the transmission shift restriction is performed to restrict shifting of the automatic transmission 3 in addition to application of the torque limitation.

When the transmission shift restriction of the automatic transmission 3 is performed while the vehicle is running, the transmission shift position at start of the transmission shift restriction is maintained until the vehicle stops. When the vehicle stops, the automatic transmission 3 is fixed to the second speed position.

Figure 6:
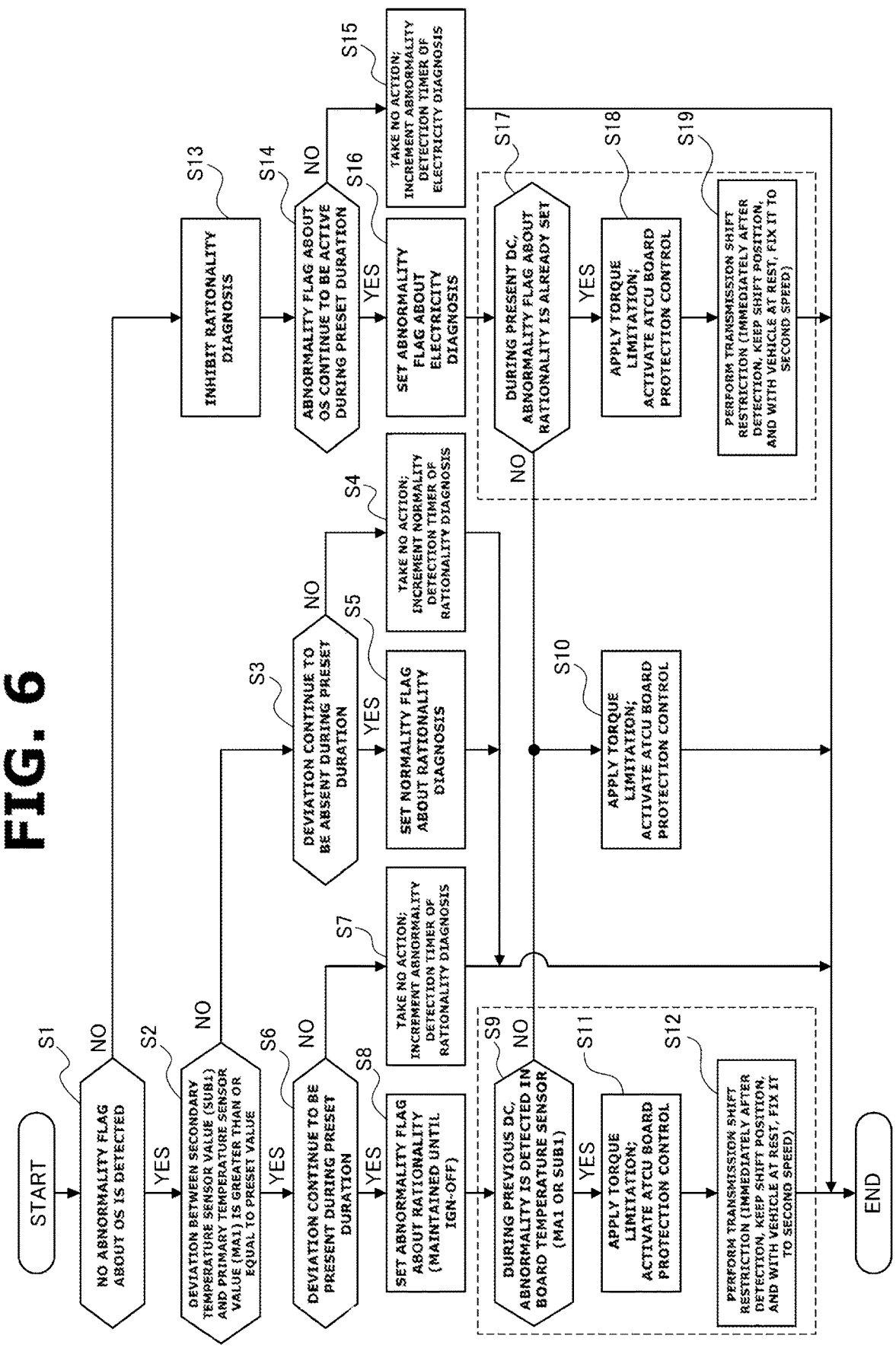
FIG. 6 is a flowchart showing a flow of a board temperature sensor diagnosis process performed by a board temperature sensor diagnosis controller of the AT control unit according to the embodiment.

<Configuration of Board Temperature Sensor Diagnosis Process> FIG. 6 shows a flow of a board temperature sensor diagnosis process performed by the board temperature sensor diagnosis controller 100 of the AT control unit 10 according to the embodiment. The following describes steps shown in FIG. 6. The flowchart of FIG. 6 is repeatedly executed at intervals of a predetermined control cycle.

At Step S1, following a start, the board temperature sensor diagnosis controller 100 determines whether or not no abnormality flag of an OS is detected. In case of YES (no OS abnormality flag is detected), the process proceeds to Step S2. In case of NO (an OS abnormality flag is detected), the process proceeds to Step S13.

The "OS abnormality flag" is an abnormality flag that is set when at least one of the primary temperature sensor value MA1 and the secondary temperature sensor value SUB1 is determined as high or low by a self-diagnosis of the electricity diagnosis part 100b, and received from an I/F function of the OS. The OS abnormality flag is different from an "electricity diagnosis abnormality flag" that is set when a break/short abnormality is confirmed by a diagnosis based on the OS abnormality flag along with a time condition.

At Step S2, following a determination at S1 that no OS abnormality flag is detected, the board temperature sensor diagnosis controller 100 determines whether or not the primary temperature sensor value (MA1) and the secondary temperature sensor value (SUB1) deviate from each other by the predetermined value or more. In case of YES (deviation above the predetermined value), the process proceeds to Step S6. In case of NO (deviation below the predetermined value), the process proceeds to Step S3.

Figure 7:
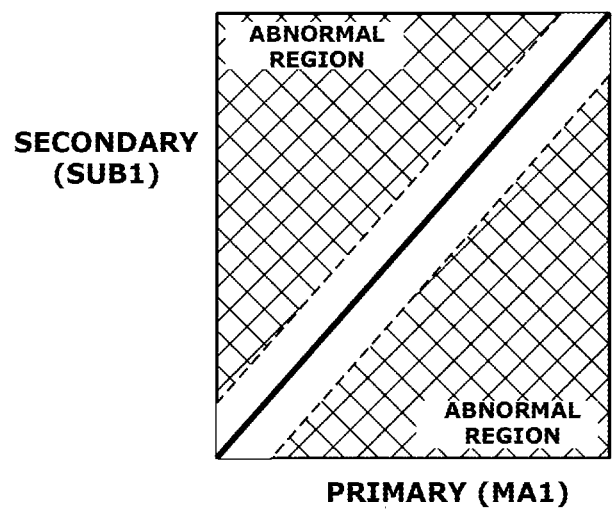
FIG. 7 is a normality/abnormality determination map diagram showing how a rationality diagnosis performs a normality/abnormality determination by comparison between two temperature sensor values.
Figure 8:
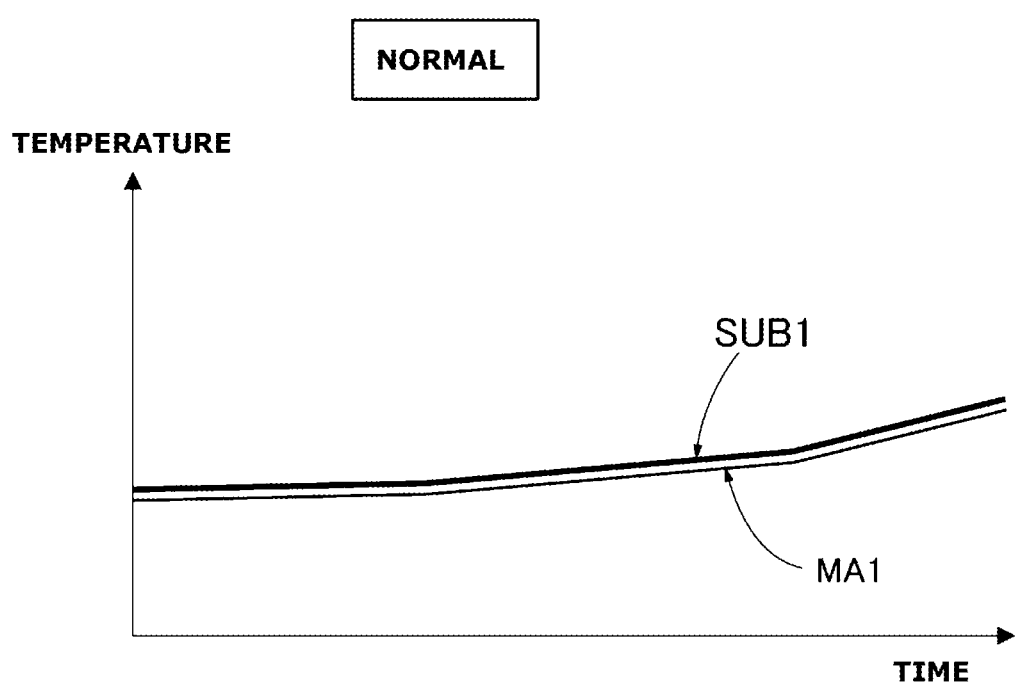
FIG. 8 is a temperature sensor value characteristic diagram showing changes of a primary board temperature sensor value and a secondary board temperature sensor value when the primary board temperature sensor and the secondary board temperature sensor are normal.

The "predetermined value" is a sum of: a maximum possible variation; a difference between temperature sensor values due to a difference in heat generation factor; and a margin for suppressing false detection, when the primary temperature sensor value (MA1) and the secondary temperature sensor value (SUB1) are normal. The primary temperature sensor value MA1 and the secondary temperature sensor value SUB1 are compared with each other, and as shown in FIG. 7, an abnormal region is defined as a region where the absolute value of difference between the primary temperature sensor value MA1 and the secondary temperature sensor value SUB1 is greater than or equal to the predetermined value. When both of the primary temperature sensor value MA1 and the secondary temperature sensor value SUB1 are normal, the secondary temperature sensor value SUB1, which has a heat generation factor, continues to be slightly higher than the primary temperature sensor value MA1, as shown in FIG. 8.

At Step S3, following a determination at S2 that the deviation is less than the predetermined value, the board temperature sensor diagnosis controller 100 determines whether or not the state where the deviation is less than the predetermined value continues for a predetermined duration. In case of YES (the state where the deviation is less than the predetermined value continues for the predetermined duration), the process proceeds to Step S5. In case of NO (the state where the deviation is less than the predetermined value does not continue for the predetermined duration), the process proceeds to Step S4. The "predetermined duration" is set to a duration (for example, about 1 sec) for preventing erroneous detection due to the occurrence of a state in which the deviation is temporarily absent.

At Step S4, following a determination at S3 that the state where the deviation is less than the predetermined value does not continue for the predetermined duration, the board temperature sensor diagnosis controller 100 increments a normality detection timer of the rationality diagnosis without taking any action including turn-on of a failure warning light (MIL turn-on), and proceeds to an end.

At Step S5, following a determination at S3 that the state where the deviation is less than the predetermined value continues for the predetermined duration, the board temperature sensor diagnosis controller 100 sets a normality flag of the rationality diagnosis and proceeds to the end.

At Step S6, following a determination at S2 that the deviation is equal to or greater than the predetermined value, the board temperature sensor diagnosis controller 100 determines whether or not the state where the deviation is equal to or greater than the predetermined value continues for a predetermined duration. In case of YES (the predetermined duration or more has elapsed), the process proceeds to Step S8. In case of NO (the predetermined duration or more has not elapsed), the process proceeds to Step S7. The "predetermined duration" is set to a duration (for example, about 1 sec) for preventing false detection due to the occurrence of a temporary deviation.

At Step S7, following a determination at S6 that the predetermined duration or more has not elapsed, the board temperature sensor diagnosis controller 100 increments an abnormality detection timer of the rationality diagnosis without taking any action such as MIL turn-on, and proceeds to the end.

At Step S8, following a determination at S6 that the predetermined duration or more has elapsed, the board temperature sensor diagnosis controller 100 sets a rationality abnormality flag that is maintained until the ignition switch 15 is turned off, and proceeds to Step S9. When the rationality abnormality flag is set, the MIL turn-on is activated and a failure code is stored in a memory.

At Step S9, following the setting of the rationality abnormality flag at S8, the board temperature sensor diagnosis controller 100 determines whether or not abnormality of the primary board temperature sensor 31 or the secondary board temperature sensor 32 is detected in the previous driving cycle. In case of YES (temperature sensor abnormality detected), the process proceeds to Step S11. In case of NO (no temperature sensor abnormality detected), the process proceeds to Step S10.

At Step S10, following a determination at S9 that no temperature sensor abnormality is detected or a determination at S17 that the rationality abnormality flag is not set, the board temperature sensor diagnosis controller 100 activates the ATCU board protection control while performing torque limitation to limit the input torque of the automatic transmission 3, and proceeds to the end.

The ATCU board protection control with the torque limitation is a first step treatment (countermeasure) executed in the driving cycle in which the primary board temperature sensor 31 or the secondary board temperature sensor 32 is diagnosed as abnormal by the rationality diagnosis. The "torque limitation" is executed by outputting a torque limitation request from the AT control unit 10 to the engine control unit 11.

At Step S11, following a determination at S9 that a temperature sensor abnormality is detected, the board temperature sensor diagnosis controller 100 activates the ATCU board protection control while performing the torque limitation to limit the input torque of the automatic transmission 3, and proceeds to Step S12.

At Step S12, following the torque limitation at S11, the board temperature sensor diagnosis controller 100 performs transmission shift restriction to restrict a normal shift control of the automatic transmission 3, and proceeds to the end.

S9, S11 and S12, which are surrounded by a broken line, form a second step treatment (countermeasure) as a fail-safe control or limp home control, which is executed when a double failure is possible during two or more consecutive driving cycles, wherein this transmission shift restriction is added to the torque limitation. Furthermore, the "transmission shift restriction" to restrict shifting of the automatic transmission 3 is implemented by fixing the automatic transmission 3 to the second speed position when the vehicle is at rest. On the other hand, when the vehicle is traveling, the transmission shift restriction of the automatic transmission 3 is implemented by first maintaining the automatic transmission 3 in the transmission shift position at the start of the transmission shift restriction until the vehicle stops, and when the vehicle stops, fixing the automatic transmission 3 to the second speed position.

At Step S13, following a determination at S1 that the OS abnormality flag is detected, the board temperature sensor diagnosis controller 100 inhibits the rationality diagnosis (diagnosis processing through S2 to S12), and proceeds to Step S14.

At Step S14, following the inhibition of the rationality diagnosis at S13, the board temperature sensor diagnosis controller 100 determines whether or not the OS abnormality flag has been continuously set for a predetermined duration. In case of YES (the predetermined duration or more has elapsed), the process proceeds to Step S16. In case of NO (the predetermined duration or more has not elapsed), the process proceeds to Step S15.

At Step S15, following a determination at S14 that the predetermined duration or more has not elapsed, the board temperature sensor diagnosis controller 100 increments an abnormality detection timer of the electricity diagnosis, and proceeds to the end, without taking any action such as MIL turn-on.

At Step S16, following a determination at S14 that the predetermined duration or more has elapsed, the board temperature sensor diagnosis controller 100 sets an abnormality flag of the electricity diagnosis, and proceeds to Step S17. When the abnormality flag of the electricity diagnosis is set, the MIL turn-on is activated and a failure code is stored in the memory.

Figure 9:
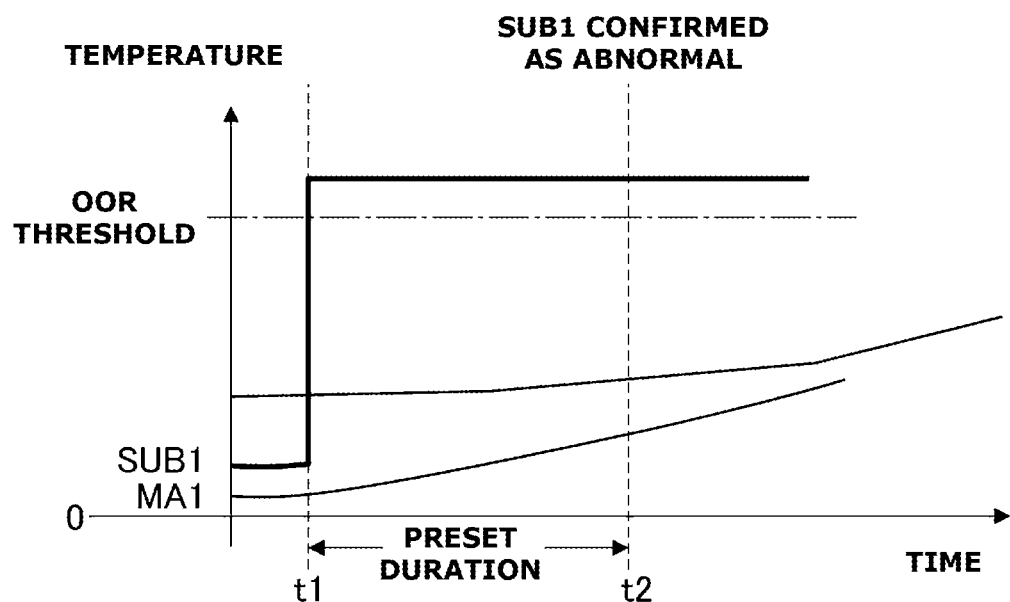
FIG. 9 is a temperature sensor value characteristic diagram showing changes of the primary board temperature sensor value and the secondary board temperature sensor value when the secondary board temperature sensor is diagnosed by an electricity diagnosis as having a short abnormality.
Figure 10:
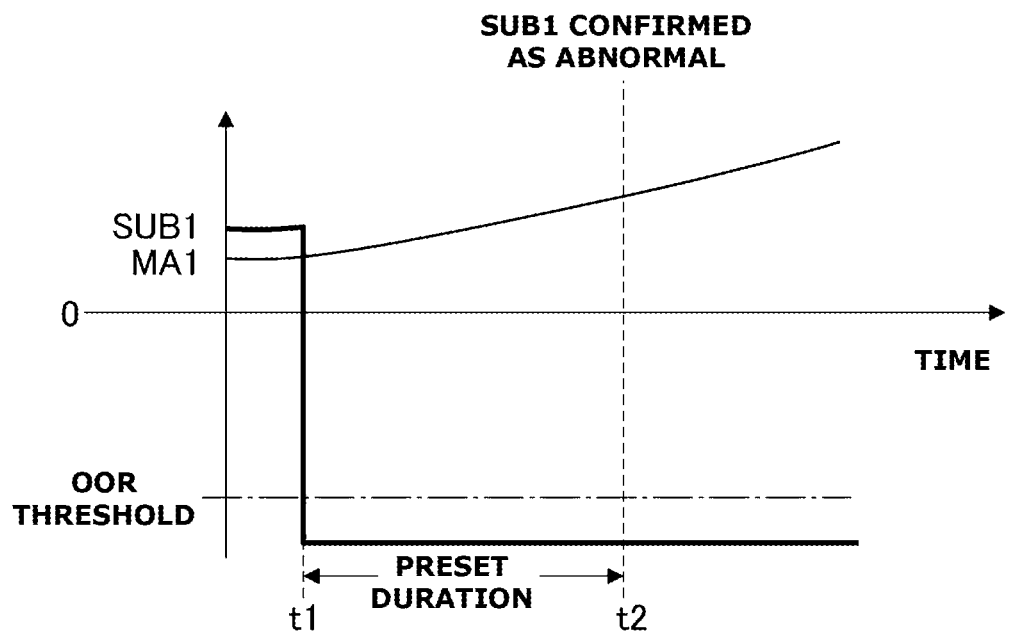
FIG. 10 is a temperature sensor value characteristic diagram showing changes of the primary temperature sensor value and the secondary temperature sensor value when the secondary board temperature sensor is diagnosed by the electricity diagnosis as having a break abnormality.

For example, as shown in FIG. 9, in a situation where the electricity diagnosis part 100b determines that the secondary temperature sensor value SUB1 is fixed to the high side due to a short, the board temperature sensor diagnosis controller 100 confirms the short abnormality of the secondary board temperature sensor 32 at a time instant t2 when the predetermined duration has elapsed since the short occurs at a time instant t1. On the other hand, as shown in FIG. 10, in a situation where the secondary temperature sensor value SUB1 is fixed to the low side due to a break, the electricity diagnosis part 100b confirms the break abnormality of the secondary board temperature sensor 32 at a time instant t2 when the predetermined duration has elapsed since the break occurs at a time instant t1.

At Step S17, following the setting of the abnormality flag of the electricity diagnosis at S16, the board temperature sensor diagnosis controller 100 determines whether or not the rationality abnormality flag is already set during the current driving cycle. In case of YES (the abnormality flag is already set), the process proceeds to Step S18. In case of NO (the abnormality flag is not set), the process proceeds to Step S10. Simultaneously, it is also determined whether or not the electrical abnormality flag is set for the two board temperature sensors 31 and 32.

When the rationality abnormality flag is not set, the board temperature sensor diagnosis controller 100 proceeds to Step S10, based on the determination of the single failure, and activates the ATCU board protection control while performing the torque limitation to limit the input torque of the automatic transmission 3, and proceeds to the end.

At Step S18, following a determination at S17 that the rationality abnormality flag is already set, the board temperature sensor diagnosis controller 100 activates the ATCU board protection control while performing the torque limitation to limit the input torque of the automatic transmission 3, and proceeds to Step S19.

At Step S19, following the torque limitation at S18, the board temperature sensor diagnosis controller 100 performs the transmission shift restriction to restrict the normal shift control of the automatic transmission 3, and proceeds to the end.

S17, S18, and S19, which are surrounded by a broken line, form a second step treatment (countermeasure) as a fail-safe control or limp home control, which is executed based on the determination of the double failure, wherein the transmission shift restriction is added to the torque limitation. The double failure is one of the following failures:

(electrical abnormality of the primary board temperature sensor 31)+(electrical abnormality of the secondary board temperature sensor 32), (electrical abnormality of the secondary board temperature sensor 32)+(electrical abnormality of the primary board temperature sensor 31), (temperature sensor rationality abnormality)+(electrical abnormality of the primary board temperature sensor 31), and (temperature sensor rationality abnormality)+(electrical abnormality of the secondary board temperature sensor 32).

The following describes "Problems Before Background Art, and Solution to Problems", and then describes behavior of the embodiment in separate sections, i.e. "Behavior of Rationality Diagnosis of Board Temperature Sensors" and "Behavior of Electricity Diagnosis of Board Temperature Sensors".

<Problems Before Background Art, and Solution to Problems> In the background art, the abnormality diagnosis for the primary board temperature sensor and the secondary board temperature sensor is implemented by an electricity diagnosis to determine a break/short abnormality by high/low determination on an OS side about a primary temperature sensor value and a secondary temperature sensor value. This electricity diagnosis can determine which of the two board temperature sensors is abnormal.

Accordingly, when a high/low failure of the primary board temperature sensor used for control is confirmed, it is treated by replacement with the secondary temperature sensor value from the secondary board temperature sensor. Then, when it is confirmed that the primary board temperature sensor and the secondary board temperature sensor each have a break/short abnormality, a fail-safe or limp home function is ensured by transmission shift restriction of the automatic transmission.

The primary board temperature sensor and the secondary board temperature sensor are not oil temperature sensors that directly sense the temperature of transmission working fluid (ATF oil temperature), but are board temperature sensors that sense the temperature of a unit board. Therefore, the primary board temperature sensor and the secondary board temperature sensor cannot directly monitor changes in the ATF oil temperature, wherein sensing values of the board temperature sensors are used for shift control and protection control of the automatic transmission equipped with the board temperature sensors.

For this reason, there is a concern that if the board temperature sensors fail, it will affect behavior of the vehicle, and it is required to build a diagnosis and abnormality control system that meets each requirement not only from the viewpoint of safety but also from the viewpoint of regulations. Therefore, it is an issue of the background art to clarify failure modes regarding the board temperature sensors and incorporate a treatment against each failure mode.

The present inventors conducted a requirements analysis on a system having a redundant system of a primary board temperature sensor 31 and a secondary board temperature sensor 32. Attention was focused on the followings:

(a) Since the primary board temperature sensor 31 and the secondary board temperature sensor 32 are redundant, it is possible to perform a rationality diagnosis by comparison between two temperature sensor values, (b) Since the primary board temperature sensor 31 and the secondary board temperature sensor 32 are ensured to be independent from each other, it is assumed that a single failure and a double failure of the board temperature sensors 31 and 32 do not occur simultaneously, and (c) When the rationality diagnosis is performed, it may be impossible to detect a double failure because the opponent in comparison is already failed at the time of abnormality diagnosis.

For solving the problems by taking account of the foregoing attention, the automatic transmission 3, the AT control unit 10, the board temperature sensor 31, 32, and the board temperature sensor diagnosis controller 100 are provided. The temperature sensor diagnosis device for the automatic transmission 3 includes as the board temperature sensor a redundant system including the primary board temperature sensor 31 and the secondary board temperature sensor 32 that are set independent from each other. The board temperature sensor diagnosis controller 100 is configured to: determine whether or not the primary temperature sensor value MA1 from the primary board temperature sensor 31 and the secondary temperature sensor value SUB1 from the secondary board temperature sensor 32 deviate from each other by the predetermined value or more; diagnose one of the primary and secondary board temperature sensors 31, 32 as abnormal, in response to a condition that a state in which the primary temperature sensor value MA1 and the secondary temperature sensor value SUB1 deviate from each other by the predetermined value or more continues for the predetermined duration or more; perform torque limitation to limit a torque inputted from the engine 1 to the automatic transmission 3, during driving in the predetermined travel section based on the predetermined condition, after the one of the primary and secondary board temperature sensors 31, 32 is diagnosed as abnormal; and perform transmission shift restriction to restrict shifting of the automatic transmission 3 along with the torque limitation, in response to a condition that the one of the primary and secondary board temperature sensors 31, 32 continues to be diagnosed as still abnormal after the driving in the predetermined travel section is completed.

The predetermined travel section based on the predetermined condition may be a travel section corresponding to a driving cycle in which one of the two board temperature sensors 31 and 32 is diagnosed as abnormal as in the embodiment, or may be a travel section determined by other conditions other than the driving cycle.

In this way, with attention to (a), (b) and (c) described above, the torque limitation is performed during a predetermined travel section where no double failure is possible after one of the two board temperature sensors 31 and 32 is diagnosed as dysfunctional by the rationality diagnosis of the primary temperature sensor value MA1 and the secondary temperature sensor value SUB1. Then, when the predetermined travel section ends and a travel section where a double failure is possible begins, a stepwise treatment in which the transmission shift restriction is added in preparation for the occurrence of a double failure in the future.

Thereby, when a single failure abnormality is determined by comparison between the two temperature sensor values MA1 and SUB1, it is possible to ensure the driving performance during the predetermined travel section after the determination of the abnormality, and also prepare for a decrease in driving performance due to a double failure which may occur after the predetermined travel section ends. Namely, during the predetermined travel section after the determination of the abnormality, only the torque limitation is executed, and the normal shift control is not restricted, thereby ensuring the driving performance based on the shift control according to the operating point (VSP, APO). The limitation to the input torque of the automatic transmission 3 serves to suppress the amount of heat, which is generated by slip of the friction element at the time of changeover shifting, to a low level, and thereby suppress the temperature of the unit board and the temperature of the transmission hydraulic oil from rising. In addition, when the predetermined travel section ends, the transmission shift restriction of the automatic transmission 3 is performed in addition to the torque limitation. Thereby, if a double failure occurs during driving with the single failure, it is possible to prevent the driver from feeling uncomfortable due to unintended shifting to a fixed transmission shift position.

<Behavior of Rationality Diagnosis of Board Temperature Sensors> It is assumed that the primary board temperature sensor 31 and the secondary board temperature sensor 32 are normal. Under this condition, when the abnormality flag of the OS is not detected and the primary temperature sensor value MA1 and the secondary temperature sensor value SUB1 do not deviate from each other by the predetermined value or more, the flow of S1→S2→S3→S4→the end in the flowchart of FIG. 6 is repeated. Then, when the state where the temperature sensor values MA1 and SUB1 do not deviate from each other by the predetermined value or more continues for the predetermined duration or more, the process proceeds as S1→S2→S3→S5→the end, wherein at S5, the normality flag of the rationality diagnosis is set.

On the other hand, it is assumed that a functional failure such as an offset abnormality occurs in either the primary board temperature sensor 31 or the secondary board temperature sensor 32. Under this condition, when the OS abnormality flag is not detected and the temperature sensor values MA1 and SUB1 deviate from each other by the predetermined value or more, the flow of S1→S2→S6→S7→the end is repeated until the predetermined duration or more elapses. Namely, even if the temperature sensor values MA1 and SUB1 deviate from each other by the predetermined value or more, no action is taken until the predetermined duration or more elapses (S7).

Thereafter, when the OS abnormality flag is not detected and the temperature sensor values MA1 and SUB1 deviate from each other by the predetermined value or more continuously for the predetermined duration or more, the flow of S1→S2→S6→S8→S9→S10→the end is repeated. Accordingly, at S10, until the ignition switch 15 is turned off, the ATCU board protection control is active so as to perform the torque limitation to limit the input torque of the automatic transmission 3.

It is assumed that after the rationality abnormality flag is set in the previous driving cycle, the ignition switch 15 is turned on without replacing the primary board temperature sensor 31 and the secondary board temperature sensor 32 diagnosed as having a rationality abnormality. In this situation, when the OS abnormality flag is not detected and the temperature sensor values MA1 and SUB1 deviate from each other by the predetermined value or more continuously for the predetermined duration or more, the process proceeds as S1→S2→S6→S8 so that the rationality abnormality flag is set in the present driving cycle. Then, the process proceeds from S8 as S9→S11→S12, and in addition to application of the torque limitation, the transmission shift restriction of the automatic transmission 3 is performed.

When the abnormality flag of the OS is detected during the rationality diagnosis, the process proceeds from S1 to S13 at which the rationality diagnosis is inhibited.

In this way, the rationality diagnosis of the board temperature sensors 31 and 32 is implemented by the abnormality determination by comparison between the temperature sensor values MA1 and SUB1 of the primary board temperature sensor 31 and the secondary board temperature sensor 32. The rationality diagnosis has a limitation that it is impossible to identify which board temperature sensor fails, because it is based on comparison between the temperature sensor values MA1 and SUB1. However, it is possible to reduce the grade of the abnormality by the torque limitation.

Figure 11:
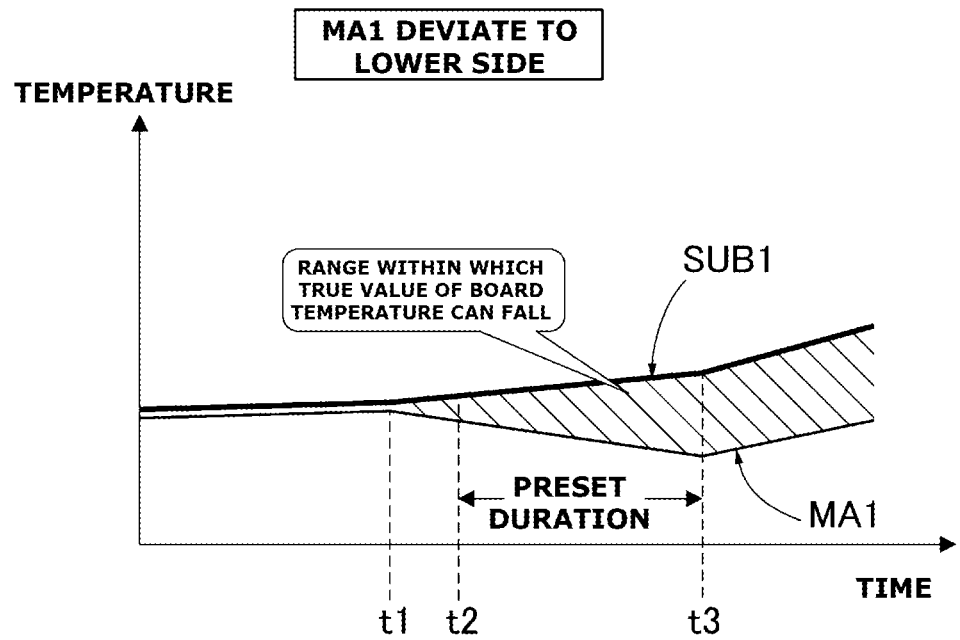
FIG. 11 is a temperature sensor value characteristic diagram showing an example of changes of the primary temperature sensor value and the secondary temperature sensor value when the primary temperature sensor value is diagnosed by the rationality diagnosis as deviating to a lower side.

Specifically, as shown in FIG. 11, in a situation where an abnormality occurs in which the primary temperature sensor value MA1 shifts to the lower side, the deviation gets equal to the predetermined value at a time instant t2 after the deviation abnormality occurs at a time instant t1. Then, the rationality abnormality of the board temperature sensors 31 and 32 is confirmed at a time instant t3 when the predetermined duration elapses from the time instant t2. After the time instant t3, by the torque limitation, the temperature sensor values MA1 and SUB1 change within a range hatched in FIG. 11 in which the true board temperature can fall.

Figure 12:
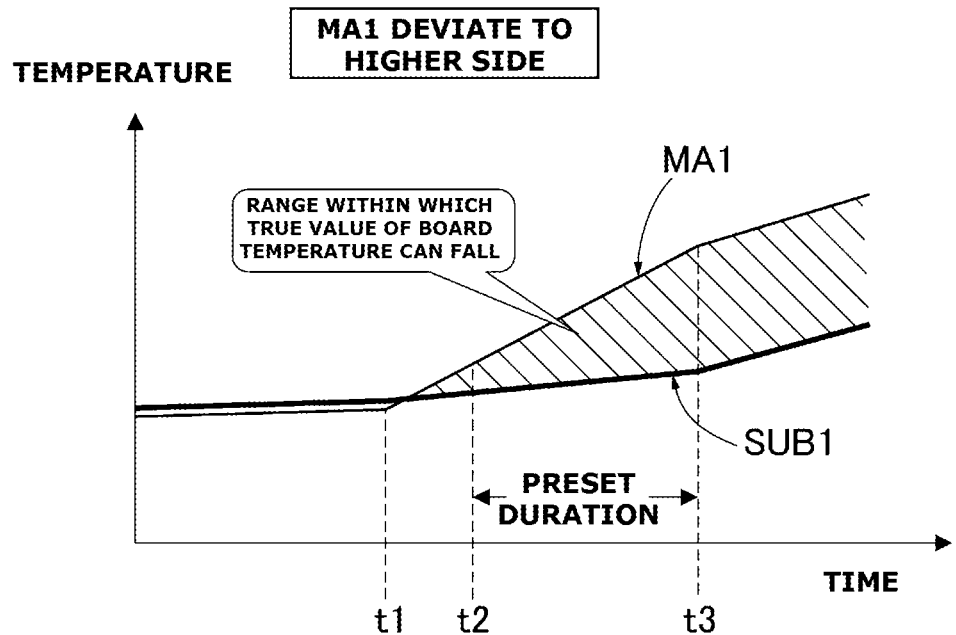
FIG. 12 is a temperature sensor value characteristic diagram showing an example of changes of the primary temperature sensor value and the secondary temperature sensor value when the primary temperature sensor value is diagnosed by the rationality diagnosis as deviating to a higher side.

As shown in FIG. 12, in a situation where an abnormality occurs in which the primary temperature sensor value MA1 shifts to the higher side, the deviation gets equal to the predetermined value at a time instant t2 after the deviation abnormality occurs at a time instant t1. Then, the rationality abnormality of the board temperature sensors 31 and 32 is confirmed at a time instant t3 when the predetermined duration elapses from the time instant t2. After the time instant t3, by the torque limitation, the temperature sensor values MA1 and SUB1 change within a range hatched in FIG. 12 in which the true board temperature can fall.

Figure 13:
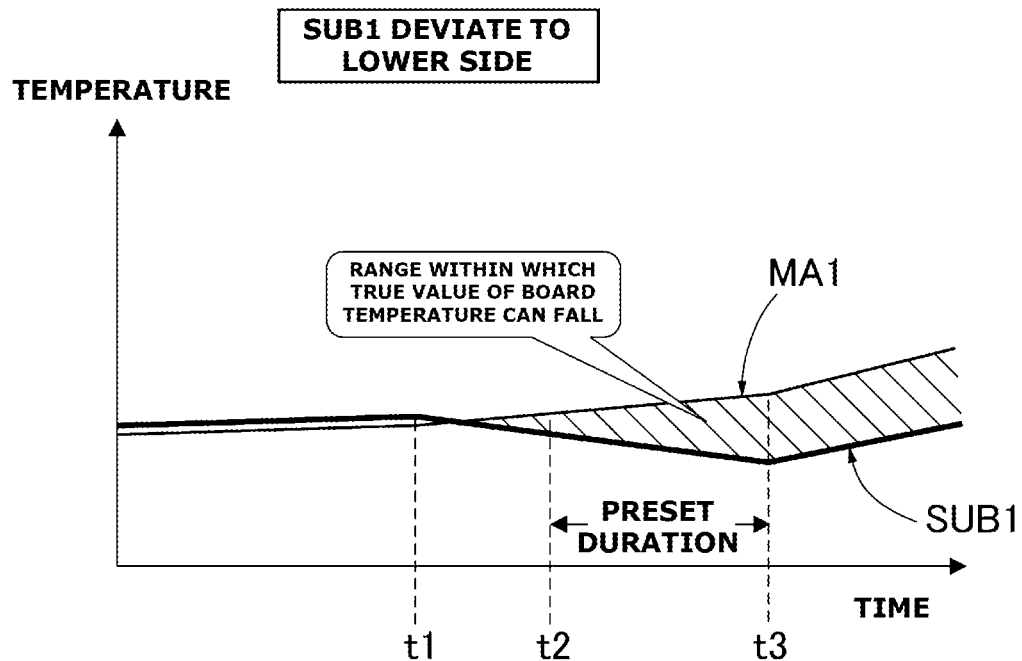
FIG. 13 is a temperature sensor value characteristic diagram showing an example of changes of the primary temperature sensor value and the secondary temperature sensor value when the secondary temperature sensor value is diagnosed by the rationality diagnosis as deviating to a lower side.

As shown in FIG. 13, in a situation where an abnormality occurs in which the secondary temperature sensor value SUB1 shifts to the lower side, the deviation gets equal to the predetermined value at a time instant t2 after the deviation abnormality occurs at a time instant t1. Then, the rationality abnormality of the board temperature sensors 31 and 32 is confirmed at a time instant t3 when the predetermined duration elapses from the time instant t2. After the time instant t3, by the torque limitation, the temperature sensor values MA1 and SUB1 change within a range hatched in FIG. 13 in which the true board temperature can fall.

Figure 14:
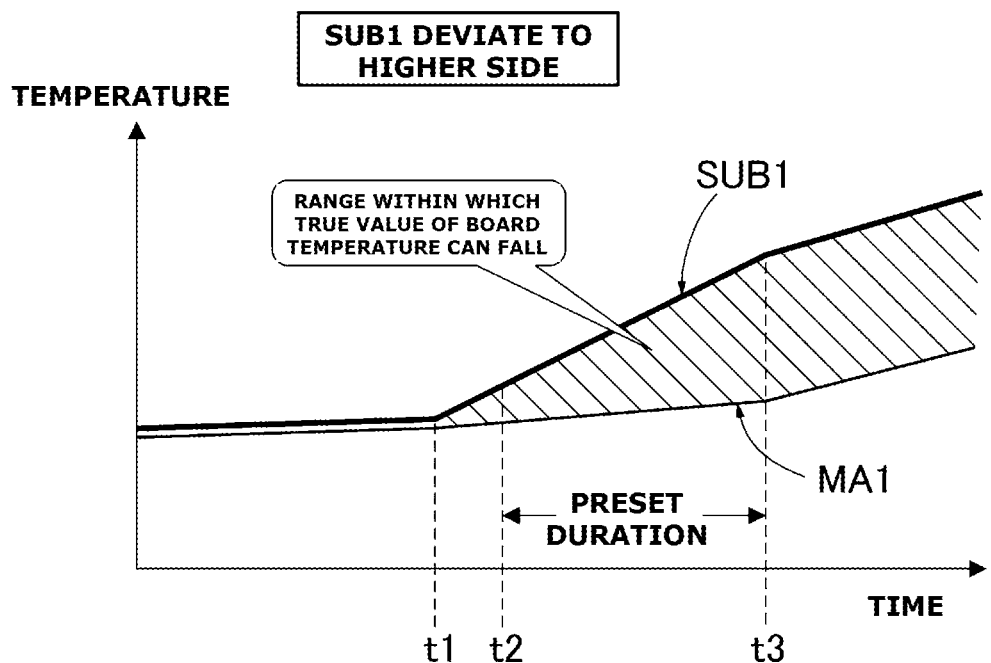
FIG. 14 is a temperature sensor value characteristic diagram showing an example of changes of the primary temperature sensor value and the secondary temperature sensor value when the secondary temperature sensor value is diagnosed by the rationality diagnosis as deviating to a higher side.

As shown in FIG. 14, in a situation where an abnormality occurs in which the secondary temperature sensor value SUB1 shifts to the higher side, the deviation gets equal to the predetermined value at a time instant t2 after the deviation abnormality occurs at a time instant t1. Then, the rationality abnormality of the board temperature sensors 31 and 32 is confirmed at a time instant t3 when the predetermined duration elapses from the time instant t2. After the time instant t3, by the torque limitation, the temperature sensor values MA1 and SUB1 change within a range hatched in FIG. 14 in which the true board temperature can fall.

In this way, the rationality diagnosis based on comparison between the temperature sensor values MA1 and SUB1 corresponds to all failure patterns, in each of which one of the temperature sensor values MA1 and SUB1 shifts to the higher side or the lower side, and can determine the rationality abnormality of the board temperature sensors 31, 32 for each failure pattern.

<Behavior of Electricity Diagnosis of Board Temperature Sensors> It is assumed that a break/short abnormality occurs in the primary board temperature sensor 31 or the secondary board temperature sensor 32. In this situation, the flow of S1→S13→S14→S15→the end is repeated until the OS abnormality flag is detected and the OS abnormality flag continues to be set for the predetermined duration or longer. Accordingly, at S13, the rationality diagnosis is inhibited, and at S15, nothing is taken until the predetermined duration or more elapses, even if the OS abnormality flag is detected.

Thereafter, when the OS abnormality flag has been detected continuously for the predetermined duration or more and the rationality abnormality flag is not set during this driving cycle, the flow of S1→S13→S14→S16→S17→S10→the end is repeated. Accordingly, at S10, until the ignition switch 15 is turned off, the ATCU board protection control is active so as to perform the torque limitation to limit the input torque of the automatic transmission 3.

On the other hand, when the OS abnormality flag is continuously detected for the predetermined duration or more and the rationality abnormality flag is set during the present driving cycle, the flow of S1→S13→S14→S16→S17→S18→S19→the end is repeated. Accordingly, in addition to application of the torque limitation at S18, the transmission shift restriction of the automatic transmission 3 is performed at S19.

In this way, the electricity diagnosis of the board temperature sensors 31 and 32 is implemented by determining whether the primary board temperature sensor 31 has a break/short abnormality and whether the secondary board temperature sensor 32 has a break/short abnormality. In contrast to the rationality diagnosis, the electricity diagnosis can distinguish between the break/short abnormality of the primary board temperature sensor 31 and the break/short abnormality of the secondary board temperature sensor 32. Accordingly, when the rationality abnormality flag is not set during the present driving cycle, it is determined that a single failure occurs, and against the single failure, the torque limitation is performed. On the other hand, when the rationality abnormality flag is set or two electrical abnormality flags are set during this driving cycle, it is determined that a double failure occurs, and against the double failure, the torque limitation and the transmission shift restriction are performed.

As described above, the temperature sensor diagnosis device for the automatic transmission 3 according to the embodiment serves to produce effects listed below.

<1> The temperature sensor diagnosis device includes: a transmission control unit (AT control unit 10) mechatronically integrated with an automatic transmission (3) and configured to control a transmission shift position or a transmission ratio of the automatic transmission (3), wherein the automatic transmission (3) is connected to a vehicle driving source (engine 1) and structured to establish the transmission shift position or the transmission ratio as requested; a board temperature sensor (31, 32) provided to the transmission control unit (AT control unit 10) and structured to sense temperature of a board of the transmission control unit (AT control unit 10), wherein the board temperature sensor (31, 32) is a redundant system including a primary board temperature sensor (31) and a secondary board temperature sensor (32) that are set independent from each other; and a board temperature sensor diagnosis controller (100) configured to diagnose the board temperature sensor (31, 32) as normal or abnormal; wherein the board temperature sensor diagnosis controller (100) is configured to: determine whether or not a primary temperature sensor value (MA1) from the primary board temperature sensor (31) and a secondary temperature sensor value (SUB1) from the secondary board temperature sensor (32) deviate from each other by a predetermined value or more; diagnose one of the primary and secondary board temperature sensors (31, 32) as abnormal, in response to a condition that a state in which the primary temperature sensor value (MA1) and the secondary temperature sensor value (SUB1) deviate from each other by the predetermined value or more continues for a predetermined duration or more; perform torque limitation to limit a torque inputted from the vehicle driving source (engine 1) to the automatic transmission (3), during driving in a predetermined travel section based on a predetermined condition, after the one of the primary and secondary board temperature sensors (31, 32) is diagnosed as abnormal; and perform transmission shift restriction to restrict shifting of the automatic transmission (3) along with the torque limitation, in response to a condition that the one of the primary and secondary board temperature sensors (31, 32) continues to be diagnosed as still abnormal after the driving in the predetermined travel section is completed. Accordingly, when a single failure abnormality is determined by comparison between the two temperature sensor values MA1 and SUB1, it is possible to ensure driving performance during driving in the predetermined travel section following the abnormality determination, and prepare for a decrease in driving performance due to a failure that may occur after the driving in the predetermined travel section is completed.

<2> The temperature sensor diagnosis device is configured such that the board temperature sensor diagnosis controller (100) is configured to: perform the torque limitation to limit the torque inputted from the vehicle driving source (engine 1) to the automatic transmission (3), during driving in a travel section corresponding to a first driving cycle from when the one of the primary and secondary board temperature sensors (31, 32) is diagnosed as abnormal to when an ignition switch (15) is turned off; and perform the transmission shift restriction to restrict shifting of the automatic transmission (3) along with the torque limitation during driving in a second or later driving cycle, in response to a condition that the one of the primary and secondary board temperature sensors (31, 32) continues to be diagnosed as still abnormal during the driving in the second or later driving cycle. Accordingly, even when it is diagnosed as a single failure abnormality by comparison between the two temperature sensor values MA1 and SUB1, the driving performance during driving in the travel section corresponding to the first driving cycle can be ensured by allowing the normal shift control while suppressing the unit board temperature and oil temperature from rising. In addition, the travel section in which no double failure is possible and the travel section in which a double failure is possible can be separated from each other according to whether it is in the first driving cycle or the second or later driving cycle.

<3> The temperature sensor diagnosis device is configured such that: the board temperature sensor diagnosis controller (100) includes a rationality diagnosis part (100a) and an electricity diagnosis part (100b); the rationality diagnosis part (100a) is configured to perform a rationality diagnosis based on how much the two temperature sensor values (MA1, SUB1) deviate from each other; the electricity diagnosis part (100b) is configured to perform a break/short abnormality diagnosis to detect a break/short abnormality by high/low determination about the primary temperature sensor value (MA1) and the secondary temperature sensor value (SUB1); and the rationality diagnosis part (100a) is configured to perform the rationality diagnosis for the primary board temperature sensor (31) and the secondary board temperature sensor (32) only when no break/short abnormality is detected by the electricity diagnosis part (100b). Accordingly, the board temperature sensor diagnosis can be performed by combination of the rationality diagnosis and the electricity diagnosis, wherein the electricity diagnosis based on break/short detection is prioritized.

<4> The temperature sensor diagnosis is configured such that the electricity diagnosis part (100b) is configured to: in response to detection of the break/short abnormality, inhibit the rationality diagnosis for the two board temperature sensors (31, 32); in response to a condition that the break/short abnormality continues to be detected for a predetermined duration, diagnose at least one of the primary board temperature sensor (31) and the secondary board temperature sensor (32) as having the break/short abnormality; and in response to a condition that the at least one of the primary board temperature sensor (31) and the secondary board temperature sensor (32) as having the break/short abnormality and during a present driving cycle no abnormality is determined by the rationality diagnosis part (100a), perform the torque limitation to limit the torque inputted from the vehicle driving source (engine 1) to the automatic transmission (3). Accordingly, when the rationality diagnosis and the electricity diagnosis are employed together, the independence of each of the two diagnoses can be ensured. Furthermore, when it is diagnosed as a single failure, the driving performance can be ensured by execution of the normal shift control while suppressing the unit board temperature and the oil temperature from rising.

<5> The temperature sensor diagnosis device is configured such that the electricity diagnosis part (100b) is configured to: in response to a condition that the at least one of the primary board temperature sensor (31) and the secondary board temperature sensor (32) as having the break/short abnormality and during the present driving cycle an abnormality is already determined by the rationality diagnosis part (100a), perform the transmission shift restriction along with the torque limitation. Accordingly, when it is diagnosed as a double failure, the fail-safe or limp home function can be ensured by restricting the shifting of the automatic transmission 3.

<6> The temperature sensor diagnosis device is configured such that: the automatic transmission (3) is a stepwise variable transmission structured to establish a plurality of transmission shift positions; and the board temperature sensor diagnosis controller (100) is configured to implement the transmission shift restriction for the automatic transmission (3) by: until a vehicle gets stationary, maintaining a transmission shift position selected at start of the transmission shift restriction; and when the vehicle gets stationary, fix the automatic transmission (3) to a second-speed transmission shift position. Accordingly, by restricting the shifting of the automatic transmission 3, it is possible to achieve a treatment that satisfies the safety assurance requirement, the power train protection requirement, and the limp home functionality.

The automatic transmission temperature sensor diagnosis device according to the present invention has been described above based on the embodiment. However, the invention is not limited to the specific configuration of this embodiment. Design changes and additions may be made within the substance of the invention according to the claims.

In the embodiment, the predetermined travel section based on the predetermined condition is exemplified as a travel section corresponding to a driving cycle in which one of the two board temperature sensors 31 and 32 is diagnosed as abnormal. However, the predetermined travel section based on the predetermined condition is not limited to the travel section corresponding to the driving cycle, but may be a travel section that terminates when a distance, which is predetermined for traveling with the torque limitation, is traveled. For example, the predetermined travel section based on the predetermined condition may be a travel section that terminates when a duration, which is predetermined for traveling with the torque limitation, elapses. For example, the predetermined travel section may be set different depending on a road condition such as running resistance. In short, the predetermined travel section may be determined as a section in which no double failure is possible.

In the embodiment, the transmission shift restriction of the automatic transmission 3 during traveling is implemented by maintaining the transmission shift position selected at start of the transmission shift restriction until the vehicle stops, and when the vehicle stops, fixing the automatic transmission 3 to the second speed position. However, the transmission shift restriction of the automatic transmission is not limited to the fixation to the second speed position, but may be implemented by fixing to a transmission shift position other than the second speed position, or by restricting the shifting between two specific transmission shift positions or among three transmission shift positions.

In the embodiment, the automatic transmission 3 is exemplified as an automatic transmission 3 having nine forward speeds and one reverse speed. However, the automatic transmission may be a stepwise variable automatic transmission other than the one having nine forward speeds and one reverse speed, or may be a belt type continuously variable transmission having a continuously variable transmission ratio, or may be a continuously variable transmission equipped with an auxiliary transmission, which is a combination of a continuously variable transmission and a stepwise variable transmission.

In the embodiment, the automatic transmission temperature sensor diagnosis device is applied to the automatic transmission 3 mounted on the engine vehicle. However, the automatic transmission temperature sensor diagnosis device may be applied not only to the engine vehicle but also to a hybrid vehicle or an electric vehicle.

The present application claims a priority of Japanese Patent Application No. 2019-048758 filed with the Japan Patent Office on Mar. 15, 2019, all the contents of which are hereby incorporated by reference.

The invention claimed is:

1. An automatic transmission temperature sensor diagnosis device comprising:
    a transmission control unit mechatronically integrated with an automatic transmission and configured to control a transmission shift position or a transmission ratio of the automatic transmission, wherein the automatic transmission is connected to a vehicle driving source and structured to establish the transmission shift position or the transmission ratio as requested;
    a board temperature sensor provided to the transmission control unit and structured to sense temperature of a board of the transmission control unit; and
    a board temperature sensor diagnosis controller configured to diagnose the board temperature sensor as normal or abnormal;
    wherein the board temperature sensor is a redundant system including a primary board temperature sensor and a secondary board temperature sensor that are set independent from each other; and
    wherein the board temperature sensor diagnosis controller is configured to:
        determine whether or not a primary temperature sensor value from the primary board temperature sensor and a secondary temperature sensor value from the secondary board temperature sensor deviate from each other by a predetermined value or more;
        diagnose one of the primary and secondary board temperature sensors as abnormal, in response to a condition that a state in which the primary temperature sensor value and the secondary temperature sensor value deviate from each other by the predetermined value or more continues for a predetermined duration or more;
        perform torque limitation to limit a torque inputted from the vehicle driving source to the automatic transmission, during driving in a predetermined travel section based on a predetermined condition, after the one of the primary and secondary board temperature sensors is diagnosed as abnormal; and
        perform transmission shift restriction to restrict shifting of the automatic transmission along with the torque limitation, in response to a condition that the one of the primary and secondary board temperature sensors continues to be diagnosed as still abnormal after the driving in the predetermined travel section is completed.

2. The automatic transmission temperature sensor diagnosis device as claimed in claim 1, wherein the board temperature sensor diagnosis controller is configured to:
    perform the torque limitation to limit the torque inputted from the vehicle driving source to the automatic transmission, during driving in a travel section corresponding to a first driving cycle from when the one of the primary and secondary board temperature sensors is diagnosed as abnormal to when an ignition switch is turned off; and
    perform the transmission shift restriction to restrict shifting of the automatic transmission along with the torque limitation during driving in a second or later driving cycle, in response to a condition that the one of the primary and secondary board temperature sensors continues to be diagnosed as still abnormal during the driving in the second or later driving cycle.

3. The automatic transmission temperature sensor diagnosis device as claimed in claim 1, wherein:
    the board temperature sensor diagnosis controller includes a rationality diagnosis part and an electricity diagnosis part;
    the rationality diagnosis part is configured to perform a rationality diagnosis based on how much the two temperature sensor values deviate from each other;
    the electricity diagnosis part is configured to perform a break/short abnormality diagnosis to detect a break/short abnormality by high/low determination about the primary temperature sensor value and the secondary temperature sensor value; and
    the rationality diagnosis part is configured to perform the rationality diagnosis for the primary board temperature sensor and the secondary board temperature sensor only when no break/short abnormality is detected by the electricity diagnosis part.

4. The automatic transmission temperature sensor diagnosis device as claimed in claim 3, wherein the electricity diagnosis part is configured to:
    in response to detection of the break/short abnormality, inhibit the rationality diagnosis for the two board temperature sensors;
    in response to a condition that the break/short abnormality continues to be detected for a predetermined duration, diagnose at least one of the primary board temperature sensor and the secondary board temperature sensor as having the break/short abnormality; and in response to a condition that the at least one of the primary board temperature sensor and the secondary board temperature sensor as having the break/short abnormality and during a present driving cycle no abnormality is determined by the rationality diagnosis part, perform the torque limitation to limit the torque inputted from the vehicle driving source to the automatic transmission.

5. The automatic transmission temperature sensor diagnosis device as claimed in claim 4, wherein the electricity diagnosis part is configured to:
in response to a condition that the at least one of the primary board temperature sensor and the secondary board temperature sensor as having the break/short abnormality and during the present driving cycle an abnormality is already determined by the rationality diagnosis part, perform the transmission shift restriction along with the torque limitation.

6. The automatic transmission temperature sensor diagnosis device as claimed in claim 1, wherein:
the automatic transmission is a stepwise variable transmission structured to establish a plurality of transmission shift positions; and
the board temperature sensor diagnosis controller is configured to implement the transmission shift restriction for the automatic transmission by:
until a vehicle gets stationary, maintaining a transmission shift position selected at start of the transmission shift restriction; and
when the vehicle gets stationary, fix the automatic transmission to a second-speed transmission shift position.

7. An automatic transmission temperature sensor diagnosis method provided with: an automatic transmission connected to a vehicle driving source and structured to establish a transmission shift position or a transmission ratio as requested; a transmission control unit mechatronically integrated with the automatic transmission and configured to control the transmission shift position or the transmission ratio of the automatic transmission; and a board temperature sensor structured to sense temperature of a board of the transmission control unit, wherein the board temperature sensor is a redundant system including a primary board temperature sensor and a secondary board temperature sensor that are set independent from each other; the automatic transmission temperature sensor diagnosis method comprising:
determining whether or not a primary temperature sensor value from the primary board temperature sensor and a secondary temperature sensor value from the secondary board temperature sensor deviate from each other by a predetermined value or more;
diagnosing one of the primary and secondary board temperature sensors as abnormal, in response to a condition that a state in which the primary temperature sensor value and the secondary temperature sensor value deviate from each other by the predetermined value or more continues for a predetermined duration or more;
performing torque limitation to limit a torque inputted from the vehicle driving source to the automatic transmission, during driving in a predetermined travel section based on a predetermined condition, after the one of the primary and secondary board temperature sensors is diagnosed as abnormal; and
performing transmission shift restriction to restrict shifting of the automatic transmission along with the torque limitation, in response to a condition that the one of the primary and secondary board temperature sensors continues to be diagnosed as still abnormal after the driving in the predetermined travel section is completed.

* * * * *